United States Patent [19]
Fletcher et al.

[11] 3,817,082
[45] June 18, 1974

[54] APPARATUS FOR ESTABLISHING FLOW OF FLUID MASS HAVING A KNOWN VELOCITY

[76] Inventors: James C. Fletcher, Administrator of the National Aeronautics and Space Administration with respect to an invention by; Peter Price, 3346 Grayburn Rd., Pasadena 91107; Olgerts Veikins, Arcadia, 507 Santa Rosa Rd., Arcadia 91006; Edward R. Bate, Jr., P.O. Box 4313, Pasadena 91006; Robert H. Jones, 1026 Terri Ann, West Covina 91791, all of Calif.

[22] Filed: Dec. 14, 1972

[21] Appl. No.: 315,048

[52] U.S. Cl. .................................... 73/3, 73/147
[51] Int. Cl. ........................................ G01f 25/00
[58] Field of Search ............................... 73/3, 147

[56] References Cited
UNITED STATES PATENTS
2,709,917  6/1955  Bruynes .............................. 73/147
3,425,262  2/1969  Herzog ................................ 73/3
3,595,079  7/1971  Grahm ................................. 73/3

FOREIGN PATENTS OR APPLICATIONS
144,618  3/1962  U.S.S.R. .............................. 73/3

Primary Examiner—S. Clement Swisher
Attorney, Agent, or Firm—L. D. Wofford, Jr.; W. H. Riggins; J. R. Manning

[57] ABSTRACT

An apparatus for establishing a flow of fluid mass, such as a gas, having a known velocity, characterized by an hermetically sealed chamber conforming to a closed-loop configuration and including a throat and a plurality of axially displaceable pistons for sweeping through the throat a stream of gas including a core and an unsheared boundary layer. Within the throat there is provided a cylindrical coring body concentrically related to the throat for receiving the core, and a chamber surrounding the cylindrical body for drawing off the boundary layer, whereby the velocity of the core is liberated from the effects of the velocity of the boundary layer.

6 Claims, 5 Drawing Figures

APPARATUS FOR ESTABLISHING FLOW OF FLUID MASS HAVING A KNOWN VELOCITY

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to an apparatus for establishing a flow of a fluid mass, such as a stream of gas, having a known velocity, and more particularly to an apparatus for establishing a stream of gas having a precisely known velocity for use in calibrating hot-wire anemometers and the like. As used herein, the term gas is intended to include any mass in its gaseous state.

The prior art includes numerous systems, devices and the like intended for use in establishing streams of fluid as well as numerous devices intended for use in measuring the velocity imparted to such streams. As is well known, when the velocity of a flow of fluid mass, such as a stream of gas, is sufficiently high, precise measurement of local static and total pressure readily can be employed in accurately determining flow rates. Devices employed in determining flow rates are typified by the pilot-static tube. However, as also is well known, as the velocity of a stream of fluid mass declines the energy levels of the total pressure are so reduced that differences between static and total pressures are difficult to measure employing such devices.

As a consequence of the innate inaccuracies of devices which employ the principles of the pilot-static tube in measuring flow rates, at extremely low velocities, attempts have been made to utilize devices which employ the principles of "hot-wire" anemometers. These devices also are employed as probes extended into streams, the velocities of which are to be measured, in much the same way as are pilot-static tubes. Unfortunately, hot-wire anemometers must be precisely calibrated in order to fill the need for which they are intended. Therefore, it is highly desirable to provide an apparatus for establishing a stream of gas, the velocity of which can be calculated and accepted as a standard.

The velocity distribution characteristics of gas flowing through a pipe impedes the design of systems intended to establish streams having calculated velocities. Of course, analytical and experimental investigations of the velocity distribution of a gas flowing in a pipe has been studied extensively. However, the bulk of such work has centered on the phenomena commonly termed "fully developed" pipe flow, which is defined as a flow sufficiently downstream from the pipe's entrance so that the velocity profile has become an invariant. A partially developed pipe flow, on the other hand, includes an unsheared core which has a propensity to shrink with distance as growing boundary layers envelop the core flow. The resulting velocity profiles in developing flows are distinctly different, depending upon whether the boundary layers are classifiable as laminar or turbulent boundary layers.

Laminar profiles, or velocity profiles associated with laminar boundary layers, approach a parabolic configuration from a profile approximated by a straight line. Turbulent profiles, or velocity profiles associated with turbulent flow, have distinctively different shapes, in that turbulent profiles rise very rapidly near the wall of the pipe and then deviate into a gradual curve near the center of the pipe, even when fully developed. Accordingly, it can be appreciated that for either of the aforementioned velocity profiles the velocity of the core of the flow is affected by the velocity of the boundary layers.

Because of the innate effects of a boundary layer on the velocity of a stream of gas being forced through a pipe, a great deal of difficulty has been encountered in adequately calibrating velocity measuring devices. As a consequence, facilities heretofore employed in calibrating devices such as anemometers must themselves first be calibrated.

It is, therefore, the purpose of the instant invention to provide an apparatus which can be employed in establishing streams of gas having velocities of low order, calculated substantially without error, for use in calibrating devices such as hot-wire anemometers and the like.

OBJECTS AND SUMMARY OF THE INVENTION

It is, therefore, an object of the instant invention to provide an apparatus for establishing a flow of a fluid mass having a velocity calculated substantially without error.

It is another object to provide an uncalibrated apparatus for establishing a flow of fluid mass at a calculated velocity.

It is another object to provide an improved apparatus for use in establishing a flow of fluid mass having a velocity liberated from the effects of the velocities of boundary layers.

It is another object to provide a practical and economical apparatus for establishing a stream of a fluid mass having an accurately known velocity for use in calibrating devices employed in determining flow rates for flowing streams having low-order flow rates.

It is another object to provide an improved apparatus for establishing a stream of gas, and particularly suited for use in imparting calculated flow rates to the stream whereby anemometers readily can be calibrated.

These and other objects and advantages are achieved through the use of an hermetically sealed, substantially bifurcated chamber, of a generally closed-loop configuration, including therein a throat, a plurality of pistons adapted to be driven in axial reciprocation, within the chamber, for sweeping a known volume of gas through the throat and separating means for separating resulting boundary layers from the resulting core, including a cylindrical body for receiving the core and a concentric chamber for drawing off the boundary layer, whereby the core is permitted to progress at a velocity directly proportional to the rate at which the pistons are displaced for sweeping a known volume of gas through the throat. Thus, a need for a second-order calibration of the apparatus substantially is eliminated.

DESCRIPTION OF THE PREFERRED EMBODIMENT

Figure 1:
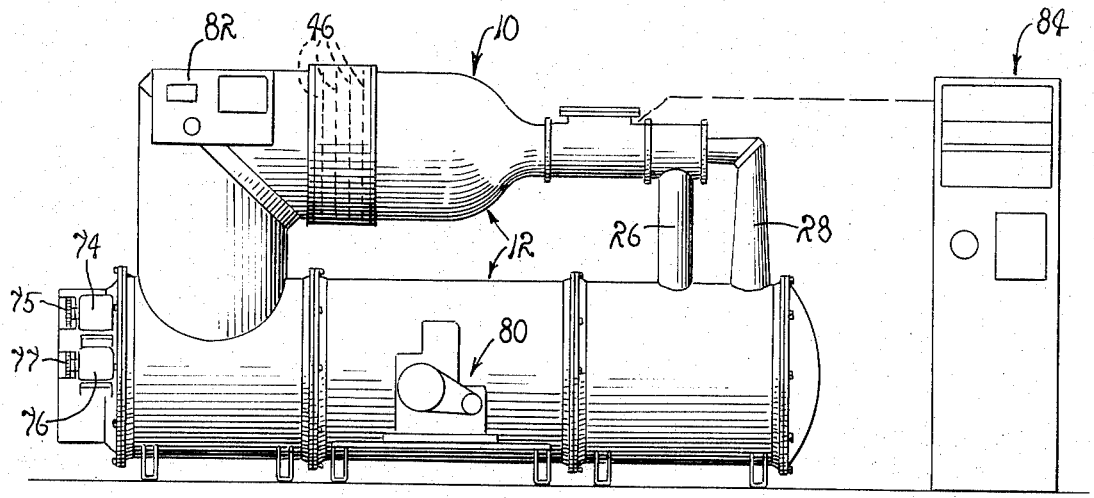
FIG. 1 is a side elevation of an apparatus which embodies the principles of the instant invention.

Referring now to the drawings wherein like reference characters designate like or corresponding parts throughout the several views, there is shown in FIG. 1 a side elevation of an apparatus 10 which embodies the principles of the instant invention.

The apparatus 10 is supported in any suitable manner at a desired location, employing suitable supporting structure, not designated. Additionally, the apparatus 10 includes a two-part, or bifurcated housing 12. This housing is, in effect, an hermetically sealed shell defined by pressure-confining walls. The shell is fabricated from suitable materials employing techniques fully consistent with known fabrication techniques, such as through a selective use of gaskets, clamps, welds and the like.

Figure 4:
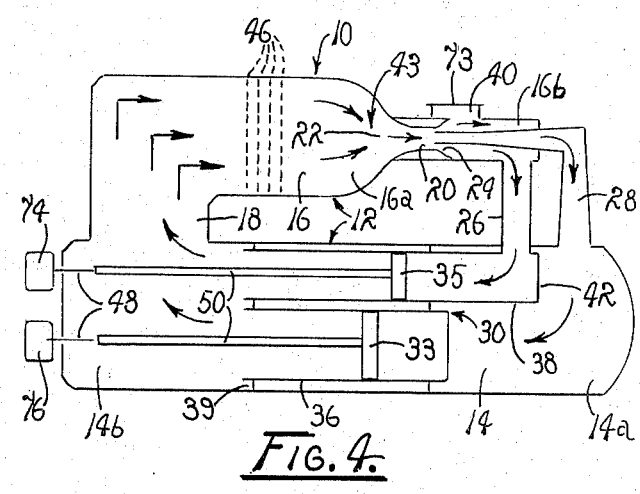
FIG. 4 is a diagrammatic view depicting a stream of a fluid mass flowing through the apparatus shown in FIG. 1.

The housing 12 conforms to a substantially closed-loop configuration through which is circulated a stream of gas confined therewithin, as more clearly illustrated in FIG. 4. The housing includes a base chamber 14, having an upstream end portion 14a and a downstream end portion 14b, and a test chamber 16 arranged in substantial parallelism with the base chamber. The test chamber includes an upstream end portion 16a and a downstream end portion 16b. The base chamber 14 communicates, at its downstream end portion 14b, with the test chamber 16, at its upstream end portion 16a through a suitable coupling 18 which, for practical purposes, is considered to be an integral part of the housing 12.

The test chamber 16, between its upstream end portion 16a and its downstream end portion 16b, is provided with a throat 20 through which the stream of gas is swept. This throat includes a converging region 22, and a diverging region 24. Consequently, a stream of gas established within the closed-loop housing 12 is constricted as it is swept through the converging region 22 of the throat 20. After passing through the throat 20, the stream of gas is conducted away from the throat, via a pair of conduits 26 and 28 which terminate in communication with an array 30 of reciprocable pistons arranged in substantial parallelism within the chamber 14.

The array 30 of axially reciprocable pistons, includes three main pistons 32, each having a disk-shaped head 33, and an auxiliary piston 34, also including a head 35. The pistons 32 are seated in open-ended cylinders 36, arranged in substantial parallelism, while a cylinder 38, paralleling the cylinders 36, is provided for receiving and supporting the auxiliary piston 34. As a practical matter, the conduit 26 intersects the wall of the cylinder 38, near its upstream end, while the conduit 28 terminates within the chamber 14, in communication with the cylinders 36, for reasons which will hereinafter become apparent.

The piston heads 33 and 35 are supported for axial reciprocation in hermetic sealing relation with their respective cylinders 36 and 38. In practice, a pair of bulkheads 39, through which the cylinders 36 and 38 are extended, are provided within the chamber 14 for hermetically isolating the upstream end portion 14a of the chamber 14 from the downstream end portion 14b. Therefore, it should readily be apparent that axial displacement of the pistons 34, within the cylinders 36, serves to reduce pressures within the upstream end portion 14a of the chamber 14, while pressures at the downstream end portion 14b of the chamber 14 are elevated.

Figure 3:
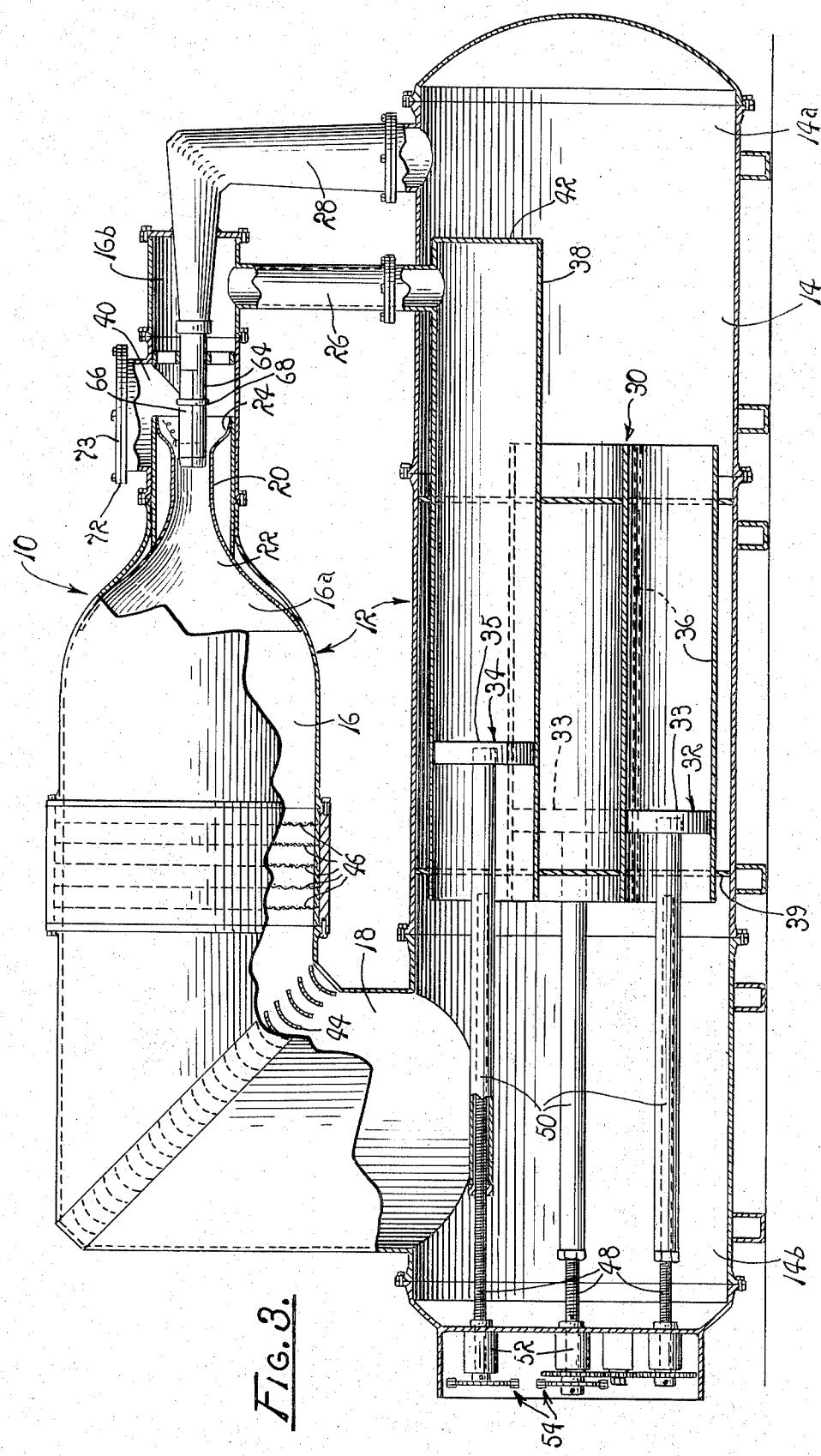
FIG. 3 is a partially sectioned, side elevation, on an enlarged scale, of the apparatus shown in FIG. 1.

From a cursory examination of FIG. 3 of the drawings, it should readily be apparent that the upstream end of the cylinder 38 provided for the auxiliary piston 34 is hermetically isolated from the upstream end portion 14a of the chamber 14 and communicates through the conduit 26 with a chamber 40 provided in the downstream end portion 16b of the chamber 16. The chamber 40 is coaxially related to the throat 20, but disposed downstream thereof. Isolation of the cylinder 38, from the upstream end of the chamber 14, of course, is effected by a simple end closure wall 42 which closes the cylinder 38, adjacent to the zone of its intersection with the conduit 26.

It is to be understood, therefore, that axial reciprocation of the pistons 32 serves to extract gas from the conduit 28, by evacuating the upstream end portion 14a of the chamber 14, while the pistons 34 serve to draw gas from the chamber 40, via the conduit 26. However, it is also to be understood that the combined effects of the displacement of pistons 32 and 34 serve to sweep the gas, before their heads 33 and 35, toward the downstream end portion 14b of the chamber 14, and thence into the throat 20 for thus establishing a stream 43 of gas extending between the end portions 14a and 14b of the chamber 14 and flowing through the chamber 16.

At the interface of the coupling 18 with the test chamber 16, there is provided a plurality of arcuate baffle plates 44. These plates are employed to reduce turbulence in the thus established stream of gas as it is delivered between the end portions 14a and 14b of the chamber 14 through the chamber 16. For similar purposes, there is interposed in the chamber 16 a series of fine screens 46 which together with the baffle plates 44 serve to substantially eliminate turbulence in the stream 43 of gas as it is swept through the chamber 16.

Axial motion is imparted to the pistons 32 and 34 through a plurality of screws 48 which are screw-threaded concentrically into a plurality of tubular shafts 50. These shafts are coupled with the piston heads 33 and 35 and function as piston shafts for imparting motion to the pistons 32 and 34.

The screws 48 extend through an end wall of the chamber 14 into a united relationship with suitable drive couplings, designated 52. Each of the drive couplings 52, in turn, includes a suitable gear box, mounted on the wall of the housing 12, externally of the chamber 14. The couplings 52 are driven through a pair of similar power trains, generally designated 54, the operation of which is hereinafter more fully described. Accordingly, it can be appreciated that the rate of axial displacement of the pistons 32 and 34 of the array 30 is dictated by the pitch of the screws and the angular velocity at which the screws 48 are driven by the power trains 54.

Therefore, the gas confined within the bifurcated chamber 14 is circulated at a rate dictated primarily by the rate at which the heads 33 and 35 of the pistons 32 and 34 of the array 30 are axially advanced by the screws 48. Furthermore, it should be appreciated that since the piston heads 33 and 35 are advanced in a downstream direction through the cylinders 36 and 38 the pressures within the upstream end portions of the cylinders are reduced, while the pressures in the downstream end portions of the cylinders simultaneously are increased. Therefore, the gas confined within the housing 12 is forced to flow as a stream through the throat 20 due to the push-draw effects of the pistons acting thereon. As the gas of the stream 43 of gas, thus established, approaches the converging region 22 of the throat 20, it has a distinct propensity to develop an unsheared core, generally designated 60, FIG. 5, sheathed in a boundary layer, generally designated 62.

Figure 5:
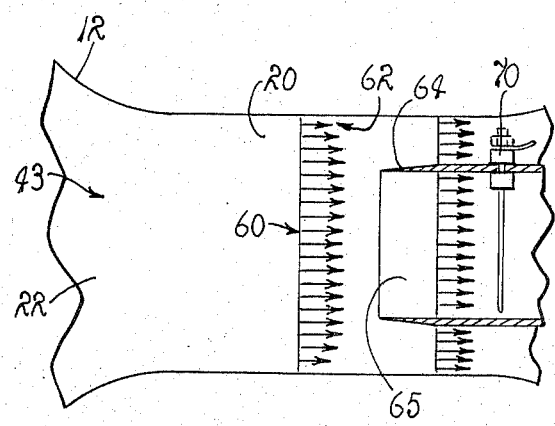
FIG. 5 is a diagrammatic view depicting one manner in which a developed boundary layer is drawn off the stream of a fluid mass as it is passed through the "test region" of the throat shown in FIG. 4.

In order to substantially liberate the velocity of the core 60 from the effects of the boundary layer 62, there is provided a coring body 64, of a cylindrical configuration which extends from the conduit 28, axially through the vacuum chamber 40, and terminates within the throat 20. The interior of the body 64 functions as a "test region," designated 65, as will hereinafter become more readily apparent. As a practical matter, the throat 20 and the coring body 64 are so dimensioned that the coring body 64 has an inside diameter slightly less than the diameter of the core 60 of the stream flowing through the throat 20. Therefore, as best shown in FIG. 5, the coring body 64 serves as a shearing device for axially separating the core 60 from the boundary layer 62. Thus, gas is swept through the "test region" absent the boundary layer.

In view of the fact that the chamber 40 is coaxially related with the throat 20, downstream thereof, the chamber 40, in effect, serves to receive the boundary layer 62 as it is sheared from the core 60. Thereafter, the boundary layer 62 is delivered through the conduit 26 to the cylinder 38. Of course, the condition of lower pressure developed within the upstream end of the cylinder 38, as the piston 34 is advanced, is communicated to the chamber 40. Consequently, the effect of the displacement of the piston 34 is to "draw off" the boundary layer 62 via the chamber 40. Thus, the core 60 is liberated from the effects of the boundary layer 62, as the core enters the upstream end of the coring body 64.

In practice, the cylindrical body 64 is severed, longitudinally within the test region, to provide a removable plate 66 of a hemi-cylindrical configuration. When seated, an hermetic seal is established along lines of severance of the plate 66 so that a desired hermetic integrity for the cylindrical body 64 is maintained. An annular support ring 68 is provided for supporting the plate 66 in place.

While not illustrated in detail, the removable plate 66 is provided with a suitable mount, generally designated 70, for receiving devices, such as anemometers, to be subjected to the effects of the stream 43 of gas as it is forced to flow through the test region 65. Since the mount 70 forms no specific part of the instant invention, it is to be understood that the mount is suitably configured for receiving a selected device to be inserted into the stream of gas as it is forced to flow through the test region 65.

In practice, an access hatch 72 is provided for affording access to the throat 20 and coring body 64 for accommodating a mounting of the selected devices within the test region 65. A sealable hatch cover 73 is provided for sealing the opening of the hatch 72. Thus an operator is afforded ready access to the test region.

Figure 2:
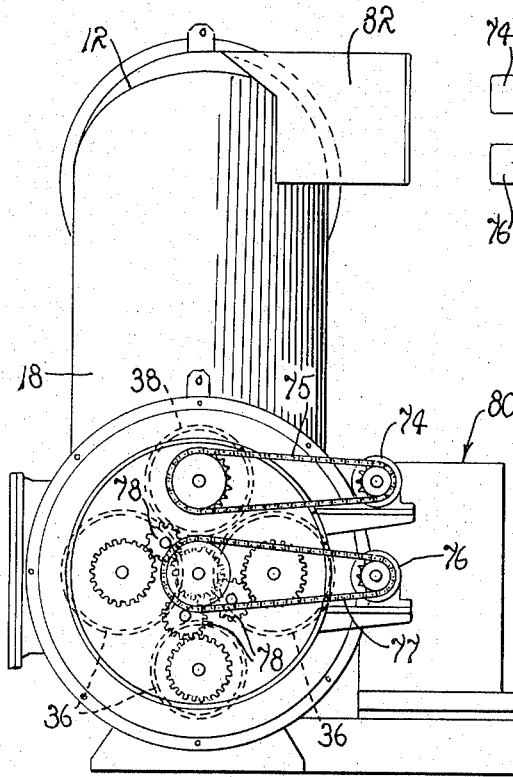
FIG. 2 is an end view, on an enlarged scale, of the apparatus shown in FIG. 1.

As best shown in FIG. 2, one of the power trains 54 includes a motor 74 connected through a belt-and-sheave drive unit 75 with the drive coupling 52 provided for the piston 34. A similar motor 76 is employed in driving the pistons 32 through a belt-and-sheave drive unit 77. The motors 74 and 76, of course, include suitable speed reduction gears for imparting a desired angular velocity to the screws 48 coupled therewith through the trains 54.

In order for different rates to be imparted to streams of gas forced to flow through the test region 65, different rates of axial displacement must be imparted to the pistons 32 and 34. Thus, the relationships established between the rates of axial displacement for the pistons 32 and 34 are, in practice, variable relationships, dictated by the calculable flow rates to be imparted to the core 60. Consequently, different flow rates to be imposed on stream flow, require that different rates of axial displacement are imparted to the pistons of the array 30. In view of the fact that each of the pistons 32 communicates with the throat 20 through the conduit 28, as well as through the coupling 18, these pistons preferably are axially displaced at a common rate, while the piston 34 is displaced at another rate, dictated by the rate at which the gas is shown off as a boundary layer. Accordingly, it has been found practical to provide the power train 54 employed in axially displacing the pistons 32 with an idler 78. This idler is coupled through a plurality of suitable spur gears 80 with the drive couplings 52 which serve to displace the pistons at a common rate. Thus, the motor 76 serves to impart a common rate of axial displacement to the piston heads 33, which rate, of course, preferably differs from the rate at which the head 35 is axially displaced by the motor 74.

It will, of course, be appreciated that the housing 12 is supplied with a suitable quantity of a selected gas, the nature of which is dictated by various parameters including the particular use for which the apparatus 10 is employed. As a practical matter, the housing 12 also includes suitable heating units, not designated, which serve to maintain the gas at a predetermined temperature. Further, a pump 80, of a suitable design, is coupled with the housing 12 and serves to supply a predetermined quantity of the selected gas to the housing. The pump 80 preferably includes circuitry for reversely pressurizing the housing 12 so that the housing can be flushed, where desired, and re-supplied with selected gaseous matter. Since the particular pump employed in pressurizing the housing 12, as well as its associated plumbing, is deemed to be a matter of convenience only, a detailed description thereof is omitted in the interest of brevity.

As shown in the drawings, a control panel 82 is mounted externally of the housing 12 at a station provided for controlling the operation of the apparatus 10. Furthermore, as shown in FIG. 1, a telemetry receiver 84 is coupled in a suitable manner with the apparatus 10, so that the operation of any device supported within the test region 65 of the throat 20 can be monitored as testing and/or calibrating procedures are performed.

Since the telemetry circuitry employed also is deemed to be a matter of convenience only, and forms no specific part of the instant invention, a detailed description thereof also is omitted in the interest of brevity.

OPERATION

It is believed that in view of the foregoing description, the operation of the device will be readily understood and it will be briefly reviewed at this point.

With the apparatus 10 assembled in the manner hereinbefore described, the access hatch 72 is opened and a probe, such as a hot-wire anemometer to be calibrated, is coupled within the mount 70. The probe preferably is, in operation, suspended within the path of the core 60 of a stream 13 of gas as it is developed within the apparatus 10 and forced through the test region 65. Therefore, once a device is supported within the mount 70 and appropriately coupled with the telemetry receiver 84, the plate 66 is repositioned and secured in place by the ring 68. The cover 73 for the access hatch 72 is seated and sealed in a suitable manner. The housing 12, where desired, is then flushed and filled with a predetermined quantity of a selected gas, employing the pump 80. Thereafter, the gas is maintained at a predetermined temperature by the aforementioned heating means.

Of course, it is to be understood that the pistons 32 and 34 of the array 30 initially are seated within the cylinders 36 and 38, respectively, in a manner such that the piston heads 33 and 35, respectively, are disposed at the upstream ends of their respective cylinders.

The motors 74 and 76 ultimately are energized for driving the power trains 54, concurrently, whereupon the drive couplings 52 simultaneously impart an angular velocity to all of the screws 48. These screws, acting through the tubular shafts 50, simultaneously advance the piston heads 33 and 35 through the cylinders 36 and 38 for thus elevating the pressures within the downstream end portion 14b of the chamber 14, while concurrently reducing the pressures in the upstream end portion 14a thereof. Consequently, a resulting stream 43 of gas is established between the end portions 14a and 14b of the chamber 14, and forced through the baffle plates 44 and the screens 46 into the throat 20 and through the test region 65.

As the stream 43 progresses through the baffles 44 and the screen 46, a substantial elimination of turbulence occurs. However, as the stream enters the throat 20 a boundary layer develops about the core 60. At a point downstream from the converging region 22 of the throat 20, preferably at the point at which an adequate core 60 still exists, the coring body 64 receives the core while the boundary layer 62 is drawn off, due to the siphoning effects of a reduced pressure established within the concentric chamber 40, as a consequence of the axial displacement of the piston head 35 within the cylinder 38.

As the boundary layer 62 is drawn off the velocity of the core is liberated from the effects of the velocity of the boundary layer 62. It should therefore be apparent that the velocity of the core 60, as it is passed through the test region 65, is independent of the velocity of the boundary layer 62. Consequently, the velocity of the core 60 is directly related to the velocity of the heads of the pistons of the array 30, as they are advanced by the power trains 54. This relationship, of course, can readily be computed, and empirically proven, if so desired.

In view of the foregoing description of the operation of the apparatus 10, it should readily be apparent that accurate control of the velocity of the stream 60 of gas is achieved through a positive displacement of the array 30 of pistons 32 and 34. Since the heads 33 and 35 of the pistons are of known diameters, and are advanced at known velocities, the pistons, in effect, serve to sweep known volumes of gas. When the relative areas of piston heads and the cross section of the test region 65 are taken into consideration, the velocity of the stream 60 of gas flowing through the test region accurately can be computed. This computation, of course, eliminates any need for a calibration of the apparatus, since the velocity of the core 60 passing through the coring body 64 is directly related to the rate at which the piston heads are displaced.

In practice, velocities have been accurately established for streams of fluid mass in ranges extending from less than 1 foot per minute to more than 500 feet per minute, during periods of durations ranging from 30 seconds to 5 minutes.

Thus, through the instant invention the perplexing problem of providing a device which establishes a stream of gas having an accurately computed velocity is solved in a practical manner.

Although the invention has been herein shown and described in what is conceived to be the most practical and preferred embodiment, it is recognized that departures may be made therefrom within the scope of the invention, which is not to be limited to the illustrative details disclosed.

We claim:

1. An apparatus for establishing a stream of a fluid mass having a known velocity, comprising:
   A. an hermetically sealed chamber confining therewithin a body of a selected fluid mass;
   B. a tubular conduit including means defining therein a throat having an entrance region and an exit region through which said body of fluid mass is swept as a stream having a core and an unsheared boundary layer;
   C. separating means within said throat for separating the boundary layer from the core and drawing off said layer as said stream is swept through said conduit, whereby the velocity of the core is liberated from the effects of the velocity of the boundary layer;
   D. said separating means including a body of cylindrical configuration supported in a coaxial relationship with said throat and terminating therewithin for receiving said core;
   E. said means for drawing off the boundary layer including an elongated chamber concentrically related to said cylindrical body and of larger diameter than said body communicating with said exit region of said throat for receiving said boundary layer.

2. The apparatus of claim 1 wherein said means for drawing off said boundary layer further includes:
   A. a cylinder having one end communicating with said elongated chamber and the opposite end thereof communicating with the entrance region of said tubular conduit;

B. a piston head supported for rectilinear reciprocation within said cylinder; and C. means for displacing said head relative to said cylinder at preselected rates for selectively establishing a vacuum of preselected magnitudes within the elongated chamber, whereby the boundary layer is drawn off at preselected velocities.

3. The apparatus of claim 2 further comprising:

another open-ended cylinder having one end communicating with said cylindrical body and the opposite end thereof communicating with the entrance region of said tubular conduit, another piston head supported for rectilinear reciprocation within said other open-ended cylinder, and means for displacing said other piston head relative to the other cylinder at another preselected rate, whereby the piston heads collectively sweep said body of fluid through said throat.

4. The apparatus of claim 3 wherein said apparatus further comprises means for affording access to said cylindrical body at a location adjacent to said throat.

5. An apparatus for establishing a stream of gas having a known velocity comprising:

A. an hermetically sealed, substantially bifurcated chamber confining therewithin a body of gas of a predetermined quantity at a given temperature;

B. means defining a throat for coupling said chamber into a substantially closed-loop configuration;

C. means for sweeping a known volume of gas through said throat including a plurality of piston heads seated for axial reciprocation within an array of cylinders, and means for advancing said piston heads through said cylinders at preselected rates, whereby one face of each piston head is subjected to a decreased pressure while the other face thereof is subject to an increased pressure, and said body of gas is swept into said throat as a stream having a core and an unsheared boundary layer forming a sheath about the core;

D. means for separating the boundary layer from the core including a cylindrical coring body supported in coaxial relationship with said throat for receiving said core, a chamber circumscribing said coring body communicating with said throat, and a conduit coupling said chamber with selected cylinder, whereby said chamber is subjected to a decreased pressure as the piston head seated within the selected cylinder is displaced; and E. drive means including driven screws coupled with each of said piston heads for simultaneously advancing the piston heads at preselected rates.

6. The apparatus of claim 5 further comprising means for suspending a test probe within said coring body.

* * * * *